No. 887,193. PATENTED MAY 12, 1908.
H. HEILING.
MINER'S CAGE.
APPLICATION FILED JULY 22, 1907.
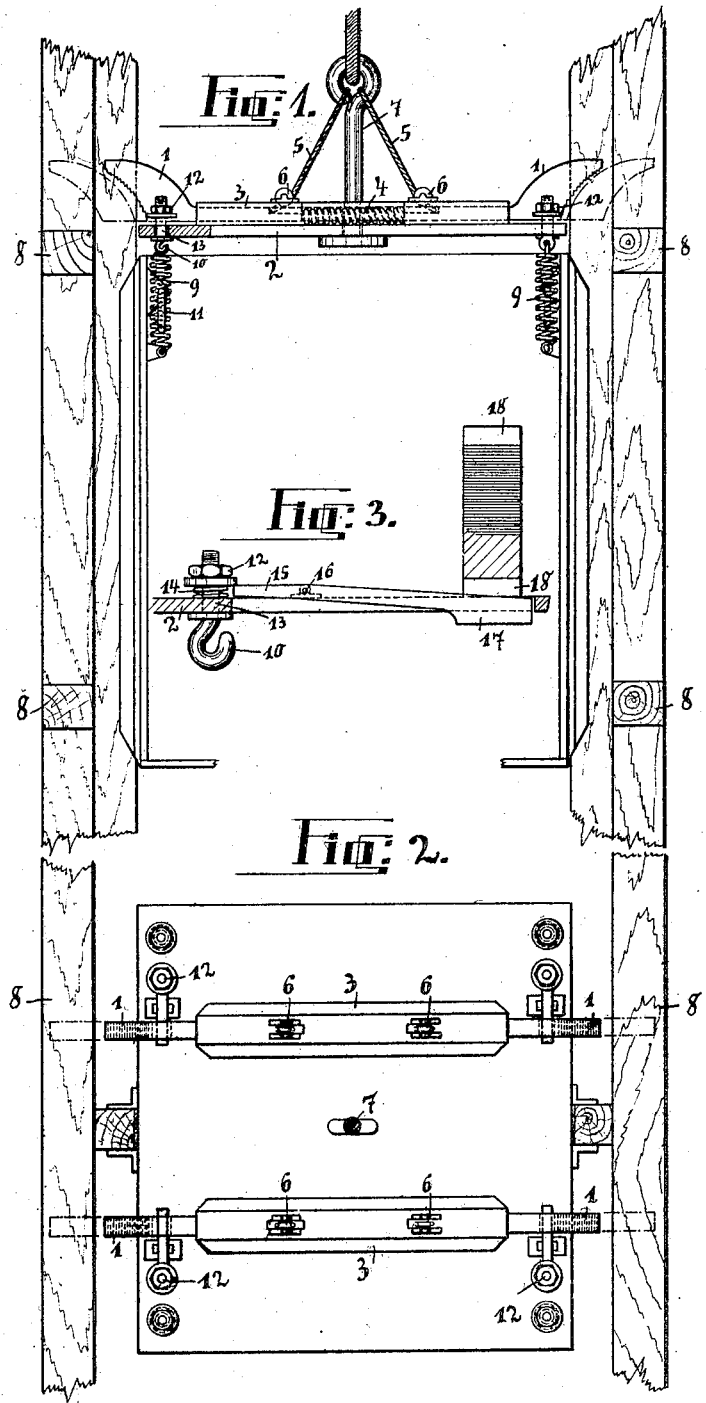

UNITED STATES PATENT OFFICE.

HEINRICH HEILING, OF DALDRUP, NEAR DÜLMEN, GERMANY.

MINER'S CAGE.

No. 887,193.  Specification of Letters Patent.  Patented May 12, 1908.

Application filed July 22, 1907. Serial No. 385,084.

*To all whom it may concern:*

Be it known that I, HEINRICH HEILING, a subject of the German Emperor, and resident of Daldrup, near Dülmen, Germany, have invented new and useful Improvements in Miners' Cages, of which the following is a specification.

This invention relates to a safety device for automatically arresting miners cages, lifts and the like upon the breaking of the hoisting rope, which is shown on the accompanying drawing in which Figures 1 & 2 are an elevation and plan respectively, of the improved device, while Fig. 3 shows on an enlarged scale a suitable arrangement for putting the safety device out of gear or action when raising dead loads only.

The safety device essentially comprises four bars 1 which are in two pairs arranged on the top 2 of the cage in brackets 3 each pair being influenced by a common spring 4. Ropes 5 which are guided over rollers 6 and fixed to the drawing-rod 7, keep the bars 1 back and thus the springs 4 in tension.

Upon breaking of the hoisting rope, the drawing-rod 7 falls down whereby the springs 4 become free and press the bars 1 so far out that the latter project within the reach of the transverse beams 8 of the shaft (see the dash and dot position of the bars 1).

The bars 1 are so shaped that the contact surface of the same which is roughened or milled-edged, stands oblique to the transverse beams 8. Hereby it is obtained that the bars 1 are not damaged or even broken but are under the falling power of the cage gradually pressed back again so that the cage slips off from the transverse beams and falls down to the next beam. At this station, or at one of the next lower beams only, the momentum of the cage is no longer sufficient to press the bars 1 back so that the cage is arrested. In order now to decrease the shocks produced by the striking of the bars on the transverse beams, strong springs 9 are arranged in such a manner that the cage is freely suspended from its top.

When raising dead loads only, the top 2 is by means of hooks 10 and rings 11 firmly fixed to the cage. Hereby, the springs 9 are preserved, while also the arresting device is put out of action in the following way:—The hooks 10 pass through the top 2 and are here provided with strong nuts 12. The bolts 13 of the hooks 10 are longer than the thickness of the top 2 and are between top and nut encircled by a spiral spring 14 which presses the nut 12 with the hooks 10 upwards. Beneath the nuts 12 project the ends of double-armed levers 15 which are fulcrumed on the top at 16 and the free ends 17 of which lie beneath the bars 1 which again are provided with notches 18.

When raising dead loads only, the hooks 10 are by firmly fixing the top to the cage drawn downwards so that the nuts 12 press also the lever ends 15 down and thus the lever ends 17 up which then place themselves into the notches 18 of the bars and thus prevent the latter from moving.

Having fully described my invention, what I claim and desire to secure by Letters Patent is—

A safety device for miners cages and lifts, comprising in combination with the shaft, the hoisting-rope, the drawing-rod and the cage; a separate top for said cage, strong springs arranged to suspend said cage from said top, spring influenced bars connected to said rod and movably arranged on said top and adapted to be pressed outwards within the reach of the transverse beams of said shaft upon the breaking of said hoisting-rope and having such a shape as to stand oblique to said transverse beams and provided on the oblique sides with roughened surfaces, means to fix said top firmly to said cage when raising dead load, and means to prevent said bars entirely from moving when raising dead load, all for the purpose set forth.

In testimony whereof I have hereunto set my hand in the presence of two subscribing witnesses.

HEINRICH HEILING.

Witnesses:
M. ENGELS,
ALFRED POHLMEYER.